(12) United States Patent
Oakley

(10) Patent No.: US 10,168,831 B2
(45) Date of Patent: Jan. 1, 2019

(54) TOUCH DEVICE DETECTION

(71) Applicant: Promethean Limited, Blackburn, Lancashire (GB)

(72) Inventor: Andrew Oakley, Blackburn (GB)

(73) Assignee: Promethean Limited (GB)

( * ) Notice: Subject to any disclaimer, the term of this patent is extended or adjusted under 35 U.S.C. 154(b) by 58 days.

(21) Appl. No.: 15/112,730

(22) PCT Filed: Jan. 20, 2015

(86) PCT No.: PCT/EP2015/051031
§ 371 (c)(1),
(2) Date: Jul. 20, 2016

(87) PCT Pub. No.: WO2015/107223
PCT Pub. Date: Jul. 23, 2015

(65) Prior Publication Data
US 2016/0378257 A1    Dec. 29, 2016

(30) Foreign Application Priority Data

Jan. 20, 2014    (GB) .................................. 1400892.4

(51) Int. Cl.
| | |
|---|---|
| *G06F 3/033* | (2013.01) |
| *G06F 3/041* | (2006.01) |
| *G06F 3/03* | (2006.01) |
| *G06F 3/044* | (2006.01) |
| *G06F 3/0354* | (2013.01) |
| *G06F 3/042* | (2006.01) |

(52) U.S. Cl.
CPC .............. *G06F 3/0418* (2013.01); *G06F 3/03* (2013.01); *G06F 3/03545* (2013.01); *G06F 3/03547* (2013.01); *G06F 3/044* (2013.01); *G06F 3/0423* (2013.01); *G06F 2203/04101* (2013.01); *G06F 2203/04104* (2013.01)

(58) Field of Classification Search
CPC ...... G06F 3/0418; G06F 3/03; G06F 3/03545; G06F 3/0325; G06F 3/033; G06F 3/044; G06F 3/03547; G06F 3/0423; G06F 3/0304; G06F 2203/04101; G06F 2203/04104; G06F 2203/04106
See application file for complete search history.

(56) References Cited

U.S. PATENT DOCUMENTS 8,564,553 B2    10/2013    Yeh et al.
8,982,102 B2     3/2015    Takano et al.
(Continued)

FOREIGN PATENT DOCUMENTS

CN    201435070    3/2010
CN    102693024    9/2012
(Continued)

OTHER PUBLICATIONS

International Search Report, dated May 8, 2015, from corresponding International Application No. PCT/EP2015/051031.
(Continued)

*Primary Examiner* — Adam R. Giesy
(74) *Attorney, Agent, or Firm* — Brient IP Law, LLC

(57) ABSTRACT

There is disclosed a technique for detecting the presence of a pointing device at an interactive surface, which interactive surface is provided with an illumination field for detecting a contact point.

20 Claims, 13 Drawing Sheets

(56) References Cited

U.S. PATENT DOCUMENTS

| | | |
|---|---|---|
| 9,063,617 B2 | 6/2015 | Eliasson et al. |
| 9,189,086 B2 | 11/2015 | McGibney et al. |
| 2007/0004452 A1 | 1/2007 | Yueh |
| 2011/0241988 A1 | 10/2011 | Bensler |
| 2012/0268414 A1 | 10/2012 | Alameh et al. |
| 2013/0106777 A1 | 5/2013 | Yilmaz et al. |
| 2013/0307787 A1 | 11/2013 | Robinson et al. |
| 2015/0029165 A1* | 1/2015 | Thompson ............ G06F 3/0416 345/179 |

FOREIGN PATENT DOCUMENTS

| | | |
|---|---|---|
| CN | 103492988 | 1/2014 |
| EP | 1457870 | 9/2004 |
| EP | 2500801 | 9/2012 |
| JP | 201243227 | 3/2012 |

OTHER PUBLICATIONS

Written Opinion of the International Searching Authority, dated May 8, 2015, from corresponding International Application No. PCT/EP2015/051031.

International Preliminary Report on Patentability, dated Aug. 4, 2016, from corresponding International Application No. PCT/EP2015/051031.

Chinese Office Action, dated Jul. 31, 2018, from corresponding Chinese Application No. 201580014673.5.

\* cited by examiner

TOUCH DEVICE DETECTION

BACKGROUND TO THE INVENTION

Field of the Invention

CROSS-REFERENCE TO RELATED APPLICATIONS

This application is the National Stage of International Application No. PCT/EP2015/051031, filed Jan. 20, 2015, entitled "Touch Device Detection," which claims priority to United Kingdom Application No. GB1400892.4, filed Jan. 20, 2014, entitled "Touch Device Detection," the entire disclosures of which are incorporated by reference herein.

The present invention is concerned with touch input detection systems, and the adaptation of such systems to allow for the detection of devices providing pen inputs. The invention particularly provides for the identification of the distinction between a contact point provided by a touch input and a contact point provided by a pen input.

Description of the Related Art

In the following description the expressions 'touch' and 'pen' are used to refer to two different types of technology for providing a contact point at an interactive surface. In a touch system a contact point may be provided by an object such as a finger, or a device such as a stylus. In a pen system a contact may be provided by an object termed a pen device or a pointing device, which can interact with the system by means other than simply providing a contact point.

Interactive systems incorporating touch and/or pen technologies are well-known in the art.

An exemplary touch system is illustrated in FIG. 1. The exemplary system comprises an interactive surface 10, a touch data processor 12, and a computer 14. A touch contact on the interactive surface provided by a finger of a hand 11 is detected, and data associated with that touch contact point provided as DATA in a data stream to the touch data processor 12. The touch data processor 12 processes the data in the data stream in accordance with known techniques, before forwarding the processed data to the computer 14 for further processing in accordance with known techniques.

Touch systems typically rely on detecting a contact point at the display surface provided by a touch such as a finger contact. Typically touch detection systems have a number of disadvantages in comparison to a system which is arranged to detect a device, such as a pen.

In a system arranged to detect a pen it is possible to distinguish between and identify multiple contact points, because a contact point may be mapped to a unique pen.

In a system arranged to detect a pen it is possible to distinguish between a contact point on a surface and a hover contact point above the surface, because a contact point may be determined to be at the display surface or proximate to the display surface.

In a system arranged to detect a pen it is possible to provide automatic switching of modes through the provision of buttons on the pen device.

Systems which are adapted to provide for detection of both touch inputs and pens can potentially provide the advantages of both systems in a single system. However such systems typically require the user to select a menu in order to switch modes.

A known interactive system incorporating touch detection utilises bezel technology.

It is an aim of the present invention to provide improvements to an interactive system incorporating bezel technology and arranged to detect touch inputs.

SUMMARY OF THE INVENTION

The invention provides a method for detecting the presence of a pointing device at an interactive surface, which interactive surface is provided with an illumination field for detecting a contact point, the method comprising: identifying a contact point using the illumination field; exciting any device proximate the surface utilising the illumination of the illumination field; determining if a wireless signal is received from a device excited by the illumination field; and in dependence on receipt of a wireless signal identifying data associated with the contact point as touch data or pen data.

The illumination field may be provided by an array of emitters disposed in X and Y axis orientations. The illumination field is preferably provided by a bezel arrangement.

The method may further comprise determining an approximate location of the pointing device, and comparing the approximate location to the location of contact point. The data associated with the contact point is identified as pen data if the locations match.

On determination of a contact point, an emitter closest to the contact point is determined, wherein an excitation signal is then emitted from that emitter. The excitation signal may be a pulse train. The excitation signal may be a wake-up pulse, sufficient to wake-up any device, such as a pen device.

Following the excitation signal, the emitters of the bezel array may be deactivated.

Following transmission of the excitation signal, a coded signal may be emitted from the emitter. The coded signal may be emitted (or transmitted) after the bezel array is deactivated for a period of time.

The excitation signal, and/or the coded signal, may be emitted/transmitted from one or more bezel emitters either side of the closest bezel emitter.

The determination of receipt of the wireless signal may be responsive to emission of the pattern signal. If no wireless signal is received, the contact point may be determined to be provided by a touch input. If a wireless signal is received, the contact point may be determined to be provided by a pen input.

There is preferably provided a pen, adapted to transmit a wireless signal on detection of the coded signal. The pen is preferably adapted to transmit on a communication channel independent of the communication channel used to detect the contact point. This communication channel is preferably a backchannel, the detection of the contact point being established on a main channel.

On determination of a plurality of contact points, an emitter of the bezel closest to each contact point is determined, and an excitation signal is transmitted from each emitter. This may be dependent upon the plurality of contact points being detected within a certain time window.

A plurality of coded signals may be transmitted corresponding to the plurality of contact points. Each of the plurality of coded signals may be distinct, being uniquely identifiable. The coded signals may be coded by comprising pulse trains of different lengths.

Following the excitation signal, the emitters of the bezel array may be deactivated. A synchronisation pulse may also be transmitted by the selected bezel emitters, following the wake-up pulse, for use by any pen at the contact points to synchronise their wireless transmissions on the backchannel.

Any such synchronisation signal is preferably transmitted before the bezel array is deactivated.

The method may further comprise receiving, at a device, a coded signal and identifying a received signal as being one of the coded signals, and to determine the intensity of the coded signal. Determining the intensity of the signal may comprise measuring the amplitude of the signal.

The method may comprise receiving, at the device, at least two coded signals, and identifying each one, and determine the intensity of each coded signal. The coded signal with the highest intensity may represent the emitter which is closest to the contact point. The device transmits in the wireless signal an identification of the received coded signals, and an indication of which of the received coded signals has the greater intensity.

The method may comprise receiving one coded signal. The device may transmit in the wireless signal an indication of the received coded signal. The device may transmit in the wireless signal a comparison of the strength of the received code signal to the strength of a coded signal which was not received. Thus when the pen receives only one coded signal, the pen may nevertheless be adapted to know the identities of two coded signals, such that the pen knows the identity of the coded signal which was not received.

There is also provided a method for a pointing device of an interactive display system, the method comprising detecting receipt of a coded signal, and transmitting confirmation of the detection.

The method may comprise detecting two or more coded signals, wherein the device further transmits an indication of the relative strength of the two or more coded signals.

On detection of only one coded signal, the device may transmit an indication that the strength of the received coded signal is stronger than the strength of the coded signal which was not received.

There is provided a contact detection system comprising bezel apparatus for identifying a contact point on a surface, the system further comprising: a wireless detection circuitry for detecting a wireless signal; and identification circuitry for identifying data associated with a detected contact point as being provided by a pen input or a touch input in dependence on detection of a wireless signal by the wireless detection circuitry.

There is provided apparatus adapted to perform any method feature.

There is provided a pointing device of an interactive display system, adapted to detect receipt of a coded signal, and to transmit confirmation of the detection. The device may be adapted to detect receipt of two or more coded signals, wherein the device is further adapted to transmit an indication of the relative strength of the two or more coded signals. On detection of only one coded signal, the device may be adapted to transmit an indication that the strength of the received coded signal is stronger than the strength of the coded signal which was not received.

BRIEF DESCRIPTION OF THE FIGURES

The present invention is now described by way of reference to the accompanying figures, in which.

DESCRIPTION OF PREFERRED EMBODIMENTS

Figure 1:
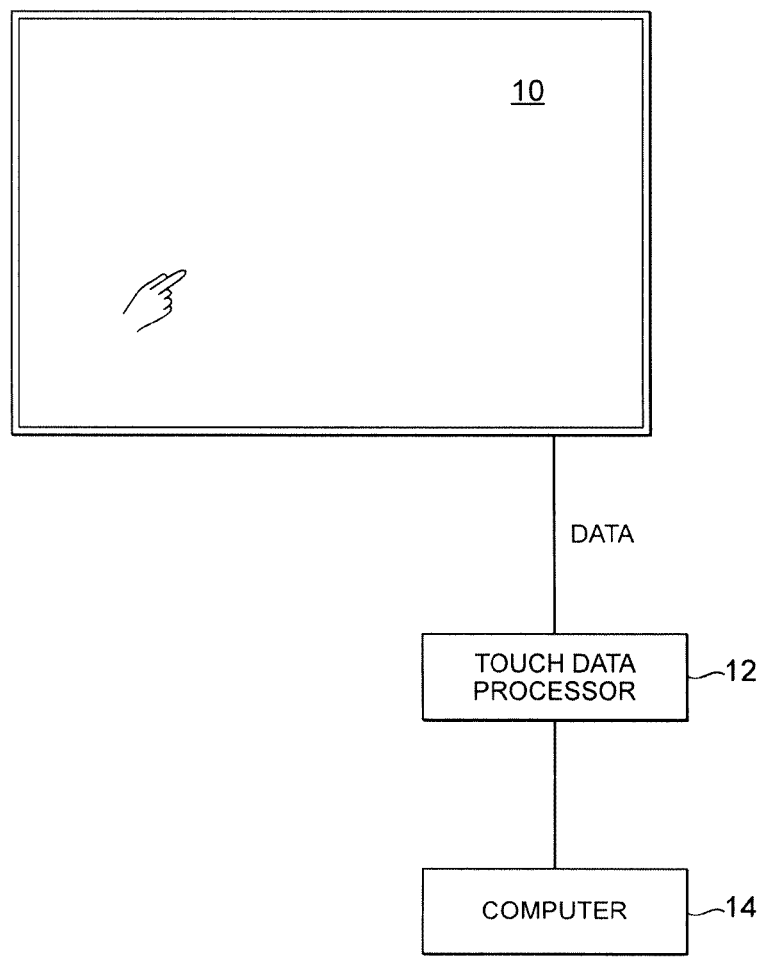
FIG. 1 illustrates a typical touch detection apparatus.

The invention is described by way of example and with reference to exemplary arrangements, and particularly in relation to exemplary interactive systems. The invention is not limited to any specific detail or arrangement described herein unless explicitly stated or defined by the accompanying claims. One skilled in the art will appreciate how described arrangements may be modified, as appropriate, with alternatives.

In the following description reference is made to a touch input. In practice the term 'touch input' is used to refer to any input at an interactive surface of an interactive system provided by any passive input device that allows interaction with programs, buttons and menus. A passive input device may be an input device with no technology housed in it and that does not communicate with the interactive system. A passive input device may include, but not be limited to, a body part such as a finger, a stylus or a pointer. In this context a passive input device is a device which cannot interact with the interactive system other than by providing a contact point on the interactive surface. A passive device may also be referred to as an inactive device.

In general a touch input can be detected as a contact input, but cannot be uniquely identified and cannot be identified as being on the interactive surface or proximate the interactive surface.

In the following description reference is also made to a pen input. In practice, the term 'pen input' is used to refer to any input at an interactive surface of an interactive system provided by any input device that allows interaction with programs, buttons and menus. Such an active input device may be an input device having technology, such as printed circuitry and/or a battery, housed in it allowing the device to communicate with the interactive system to provide a more natural interaction with the interactive system. A pen input device can provide additional features such as, but not limited to, detection of the active input device hovering above the interactive surface, pressure sensitive handwriting, and quick tool and functionality access through the inclusion of electrical switch buttons on the active input device, such as on the side of a pen input device. An input device can be any type of device, but typically may be provided by a device which resembles and is referred to as a pen device or pointing device. An input device may include, but not be limited to, light pens, infrared pens, inductive pens and capacitive pens. To the extent that such additional operations require an active link with the interactive system beyond simple detection of a contact point, a pen device can be considered to provide an active input and be an active input device.

In the art, pen devices are sometimes referred to as being passive or active devices in dependence on whether they have internal power sources for providing their interaction with the interactive system or not. For example, an active pen may be provided with a battery. This definition is not to be confused with reference to a touch input or a pen input being associated with a passive input device or an active input device. An active input device may be 'passive' or 'active' in terms of a power source. Exemplary arrangements may be advantageously implemented in conjunction with a pen input provided by an active pen in order to provide an appropriate transmission which is detected by an appropriate interface of the interactive system. Arrangements as described may be implemented with the pen being provided by either a passive or an active pen, unless the specifics of an arrangement requires an active pen.

Where a pen provides an input in a touch-only system, it may be considered a stylus.

In general a pen input can be detected as a contact input, and can be at least one of: uniquely identified (identifying the pen amongst a plurality of pens); determined as being on the interactive surface or proximate the interactive surface (such as indicating a hover or pen down state); or provide an additional input (such as a switch state).

Arrangements are described herein in the context of touch detection systems, and particularly interactive systems in which an input is detected as a touch input based on a touch provided by that input. The invention is not limited to any specifics of a touch system unless specifically stated herein, and may be implemented in any touch detection interactive system.

When a pen device providing a pen input is required to provide a pen input it may be equipped with its own power source, or it may be adapted to utilise the energy in another signal of the interactive system, such as the energy in an electromagnetic (EM) field, such as an infra-red (IR) or radio frequency (RF) field, provided on an interactive surface for detecting contact points.

When a pen device providing a pen input is adapted to transmit, it may be adapted to transmit continually or only when certain conditions are met, for example when the pen contacts the interactive surface (which for example may be facilitated by a pressure switch in the pen nib).

The invention is not limited to any arrangement of a pen device for providing a pen input although different types of pen device may allow advantageous features of the invention to be implemented.

Whilst the description of arrangements refers to detection of a wireless signal in order to detect the presence of a pen device, the arrangements may be applicable to any system in which an indication is provided as to whether a contact point is associated with a touch input or a pen input and thus whether a pen device providing pen inputs is present. Preferably, the system is arranged to detect the presence of a pen device only in contact with the touch surface, and not for example to detect the presence of a pen distant from the surface, to avoid spurious or mistaken detection. On this basis a pen device may only be detected as present when a 'pen-down' condition is detected. On this basis, a pen detector may preferably only be enabled when a contact point is detected, or the wireless detection of a signal from a pen device may be arranged such that it can only be detected if the pen is at or near the surface.

However the invention is not limited to enabling pen detection circuitry only when a contact point is detected. In a further embodiment, the pen detection circuitry may continually look for a pen, and may not be enabled only responsive to a contact point.

With respect to detecting the pen device only when the pen is near the surface, the pen may emit or detect an IR signal in a narrow zone, so that a signal from the pen is only received or detectable when the pen is in close proximity to and/or touching the surface. This is an alternative or additional feature to enabling pen detection only when a contact is detected. When the pen is arranged to receive an electromagnetic signal to give it power to transmit, it may be arranged so that it can only receive a signal to provide its necessary power when it is within certain proximity of the display surface. Alternatively or additionally a pen detector may be arranged so that it can only receive a transmission from the pen when the pen is within certain proximity of the display surface.

The receiver/detector forming part of a pen detector of the interactive system may be designed to have a restricted field of view to ensure that detection of the pen by a wireless pen detect block is only achieved when the pen is within a short distance, for example centimeters or more preferably millimeters, of the surface, to avoid spurious pen detection.

These are all alternative arrangements which allow for the wireless detection not to be dependent on first detecting a contact point, or limit the wireless detection to detecting wireless signals only from pens which are close to the surface, and not for example a wireless pen which is distant from the surface and not otherwise being detected as present at the surface.

Communication between a pen and a pen detector is preferably via infra-red (IR) transmission, and controls the associated field of view in accordance with preferred arrangements, but communication is not limited to IR transmission, and may for example be an RF transmission such as a Bluetooth transmission. In general, however, it may be preferable to provide a communication channel between the pen device and the interactive system which is a different type of communication than that which is provided for otherwise detecting a contact point. The communication channel between the pen device and the interactive system may be referred to as a 'back-channel', the main channel being the channel provided to detect a contact point.

An example arrangement which provides for detection of a pen device for providing pen inputs in a touch contact detection system is now described. In this arrangement there is disclosed a technique for determining if a single detected contact is associated with a touch contact or a pen contact.

Figure 2:
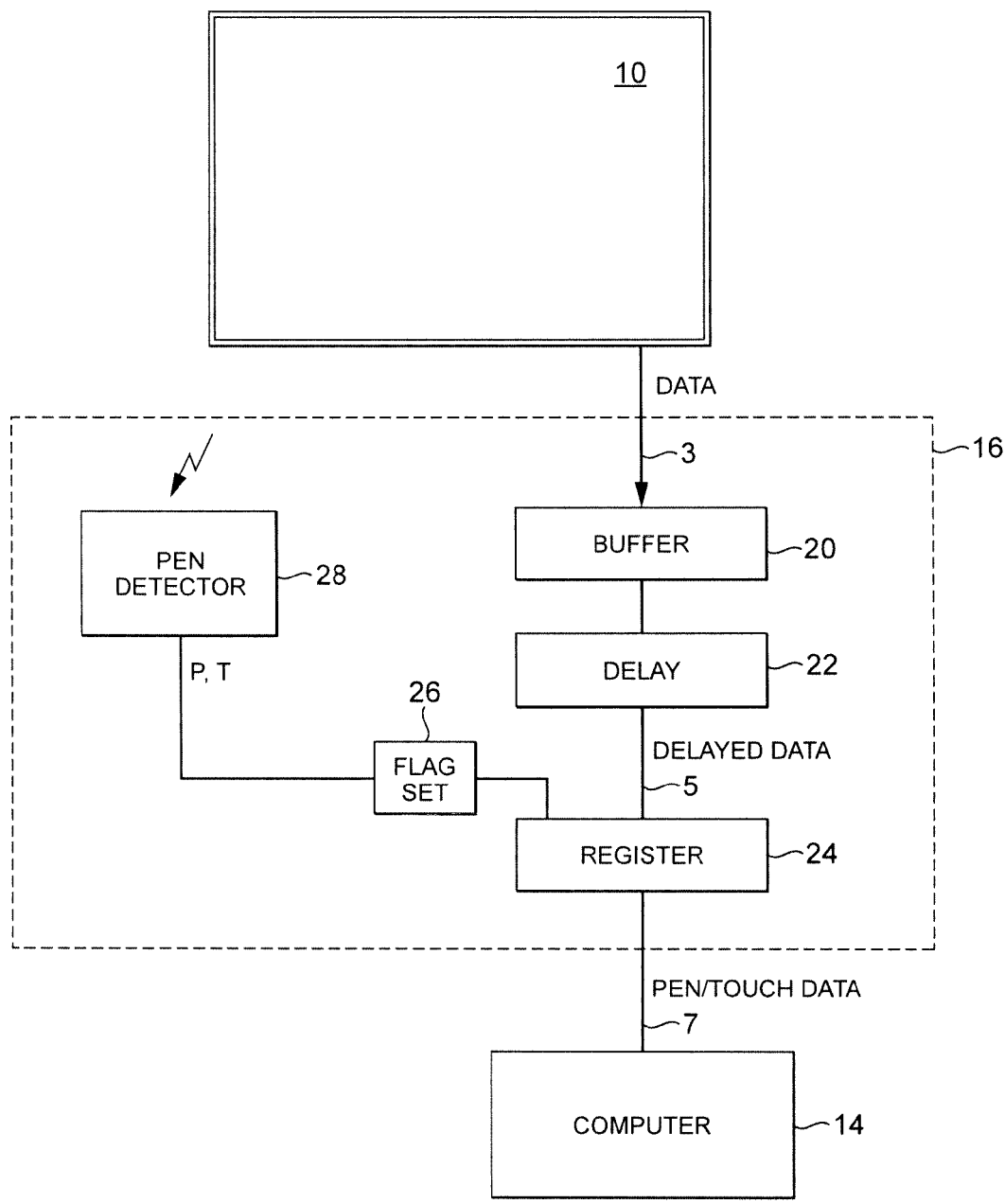
FIG. 2 illustrates a schematic of an arrangement of a touch detection apparatus adapted to detect a contact point provided by a pen.
Figure 3:
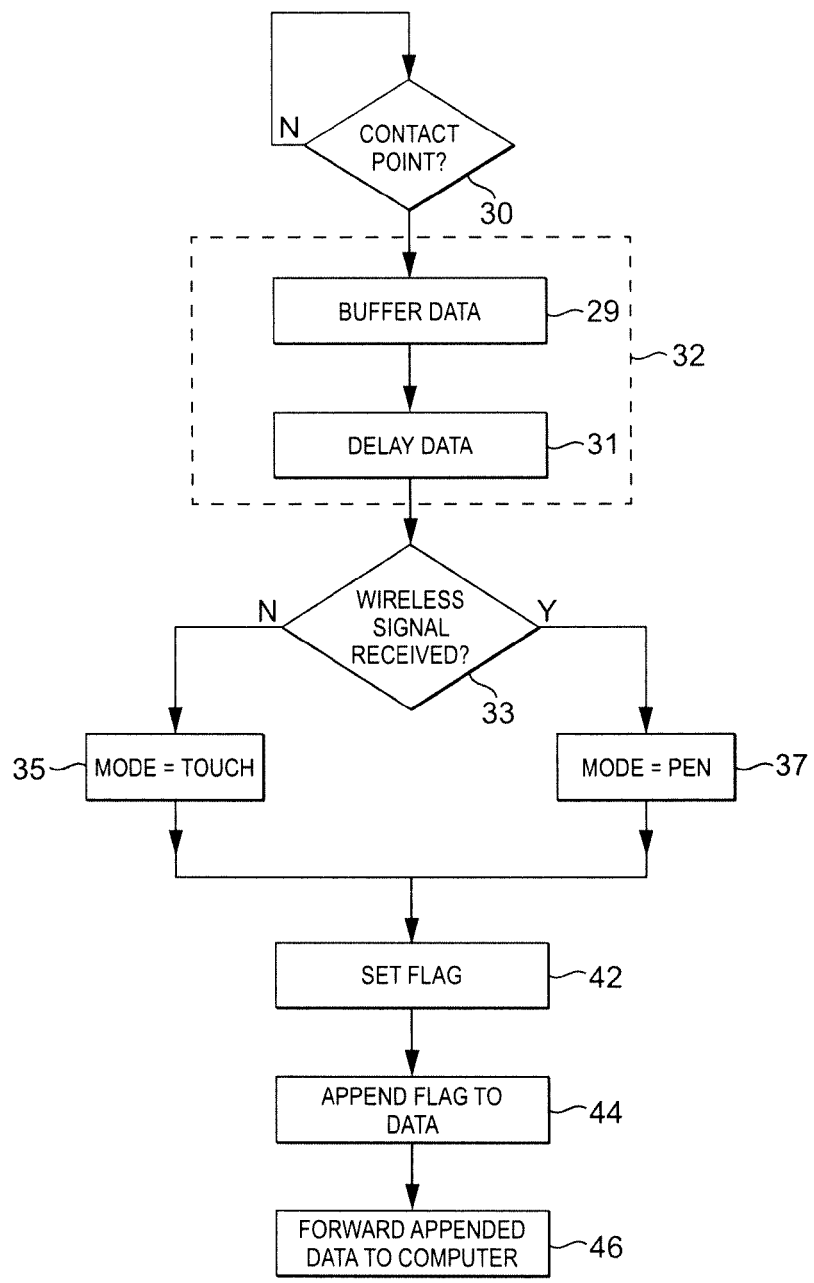
FIG. 3 illustrates a process for controlling the schematic apparatus of FIG. 2.

FIG. 2 illustrates schematically the touch contact system of FIG. 1 adapted to distinguish between pen inputs and touch inputs, and an associated flow process is illustrated in FIG. 3.

With reference to FIG. 2, there is additionally provided an interface 16 between the interactive surface 10 and the computer 14. The interface 16 comprises a buffer 20, a delay block 22, a register 24, a pen detector 28, and a flag set block 26.

A contact point on the interactive surface is detected, and data associated with this contact point, termed DATA, is forwarded on line 3 from the interactive surface 10 to the interface 16. The detection of this contact point is illustrated by step 30 in FIG. 3.

The contact point may be provided by a touch, for example a finger or a stylus or a pen.

The interface 16 receives the data stream from the interactive surface 10, which in practice may comprise receiving coordinate data from the touch surface when coordinate determination circuitry is provided with the surface. This coordinate data may be received on any electrical connection, for example, via a USB connection, but could also be received via a wireless communication network, such as Bluetooth. In the example it is assumed that the touch surface generally provides data associated with a contact point, which includes the coordinates of that contact point, but this is irrelevant to the present invention.

The data stream DATA is received by the buffer 20, and as denoted by step 29 is buffered. Also illustrated in FIG. 2 is a delay block positioned at the output of the buffer 20, and as denoted by step 31 the buffered data is also delayed. In practice, the buffer 20 may perform the delay function, and so an additional delay block 22 may not be required. The steps 29 and 31 of FIG. 3 may therefore be implemented as a single buffering/delaying step, as illustrated by reference numeral 32.

The delay associated with the buffering and/or delaying steps provided by blocks 20 and 22 results in a delayed version of the data stream DELAYED DATA being produced on line 5.

The pen detector 28 may be enabled or triggered by receipt of contact point data, and may be connected to receive the data stream DATA (not shown) simply to identify the presence of data associated with a detected contact point. The pen detector 28 may alternatively be enabled by some control means, such as the computer 14, or may be permanently enabled to detect a wireless signal.

The pen detector 28 is adapted to detect whether a wireless signal is received, as denoted by step 33, following or in tandem with detection of a contact point, so as to determine whether the contact point is provided by a pen input. A pen providing a contact point is adapted to provide a wireless transmission for detection by the pen detector 28. The pen detector 28 is adapted to detect this wireless transmission.

The pen and/or interface 16 are preferably adapted such that a wireless signal from the pen can only be detected when the pen is within a certain proximity of the interactive surface. For example, a pen may only be excited to transmit a wireless signal when it is excited by an energy field (e.g. infra-red) close to the display surface, and/or when the pen receives an enquiry/interrogation signal, and/or when the pen nib is pressed against the display surface. However, in general, any known technique may be utilised for a pen to transmit a wireless signal which can be detected by the pen detector 28.

In dependence on whether a wireless signal is received in combination with detection of a contact point, the pen detector 28 dictates whether the system operates in pen mode or touch mode.

In this arrangement, if a wireless signal is received the system operates in pen mode as denoted by step 37. If a wireless signal is not received the system operates in touch mode, as denoted by step 35. The pen detector 28 sets a signal on its output to indicate a pen (P) or a touch (T), to control the flag set block 26 to set the flag bits of the register 24 in accordance with the mode of operation.

If the pen detector 28 does not detect a wireless signal, then the pen detector 28 sets its output accordingly to the flag set block 26 indicating that no pen is present. This may simply comprise setting its output to '0' or '1' to indicate the system mode (pen or touch) which is followed by the flag set block 26. The setting at the output of the flag set block indicates a touch mode.

If the pen detector 28 does detect a wireless signal, then the pen detector 28 sets its output accordingly to the flag set block 26 indicating that a pen is present. Again this may simply comprise setting its output to '0' or '1'. The setting at the output of the flag set block indicates a pen mode.

On determination of the mode of operation, in step 42 the appropriate flag is set by the flag set block 26. In step 44, the flag set block then controls the register to append the appropriate bits to the current data which is held in the register 24.

As denoted by step 46, the appropriately appended data is then output by the register 24 to the computer 14 on line 7 as the data PEN/TOUCH DATA.

Some latency is associated with the passing of the data to the computer 14, because of the additional processing needed to determine whether the contact is provided by a touch or a pen. Data processing is not performed by the computer 14 until a determination of the input is made, and such processing has a latency determined by the delay of the buffer 20 and/or delay block 22.

The delay provided by the buffer 20 and/or delay block 22 is preferably sufficient to allow the pen detector 28 to complete a determination of whether the contact input is a pen input or a touch input. The data stream may be delayed by n frames, where n=1 or 2 or 3, etc. Preferably the data stream may be delayed by one frame—i.e. frame delayed. During the delay, the pen interface 16 determines whether the object on the surface is a pen. This may be done in a number of ways and the above described technique represents a way of achieving this in accordance with a first arrangement.

The data DELAYED DATA provided to the register 24 is the data for which the mode of operation is determined for the flag setting.

Arrangements provide for multiple contact points provided by one of multiple pens to be detected on the interactive surface of an interactive whiteboard (IWB), and for any contact point to be determined as a pen contact point or a touch contact point.

By use of a contact surface utilising bezel technology for detecting contact points, a determination of the coarse position of a pen may be achieved. Contact surfaces using bezel technology are well-known in the art, and their implementation is not shown in detail in the figures.

IR bezel systems are commonly arranged so that one horizontal side and one vertical side emit IR and the opposing sides receive IR, and examples are described in the context of such a system. However whilst the detection method described herein assumes this arrangement, it is equally applicable to bezel touch systems that place emitters and receivers on all four sides.

The term 'bezel' refers to the complete object detection subsystem which is capable of determining the X and Y coordinate of the object anywhere on the interactive whiteboard surface.

In general, in an IR bezel system, the surface is scanned sequentially. On both the X-axis and the Y-axis transmitters are sequentially excited to generate IR signals. Such operation of a bezel system will be known to one skilled in the art.

An IR detector located in a pen can be arranged to detect incident IR radiation generated by excited transmitters associated with the touch surface, such as bezel emitters on a touch sensitive surface. A pen may be adapted to include an IR detector adapted to detect an IR illumination field on the interactive surface. If the IR detector in the pen is equally sensitive to IR radiation from any horizontal direction, the IR detector in the pen will see a peak IR flux as the bezel emitter closest to the pen becomes active. This will occur in both the X and Y axes. This example assumes that a pen is adapted to include such a detector.

In practice, the plurality of IR emitters will vary in emission power meaning that it is possible for an emitter not closest to the pen detector to cause the pen detector to receive peak IR. This will not stop the system working, it will just reduce the accuracy of any coarse location system and limit how close together two objects can be correctly assigned. The preferred embodiment will describe a ratiometric measurement technique that overcomes this problem.

Based on some timing mark, a time measurement to the infra-red peak detected by the pen can be made. The provision of the timing mark may be in a number of ways. For example, the timing mark may be provided by marking the start of a sweep of the bezel array, the purpose of such sweep being to determine whether there is a contact point on the interactive surface. In an arrangement, a pen detector is adapted to receive a notification from the controller of the bezel apparatus, to indicate the start of a bezel sweep and confirm the timing mark.

On the basis that the start of the sweep is thus determined by this or other suitable means, a time measurement from the timing mark to the peak of the IR flux detected by a pen can be made which is proportional to the X-Y distance of the pen from the sweep start location. The sweep start location may be the corner of the touch surface. This provides a coarse measurement for the location of the pen. In accordance with this arrangement, this coarse measurement of location of the pen can then be used to try and match it to one or more currently detected touch coordinates and set the corresponding pen/touch mode for the system for that particular object position.

Figure 4:
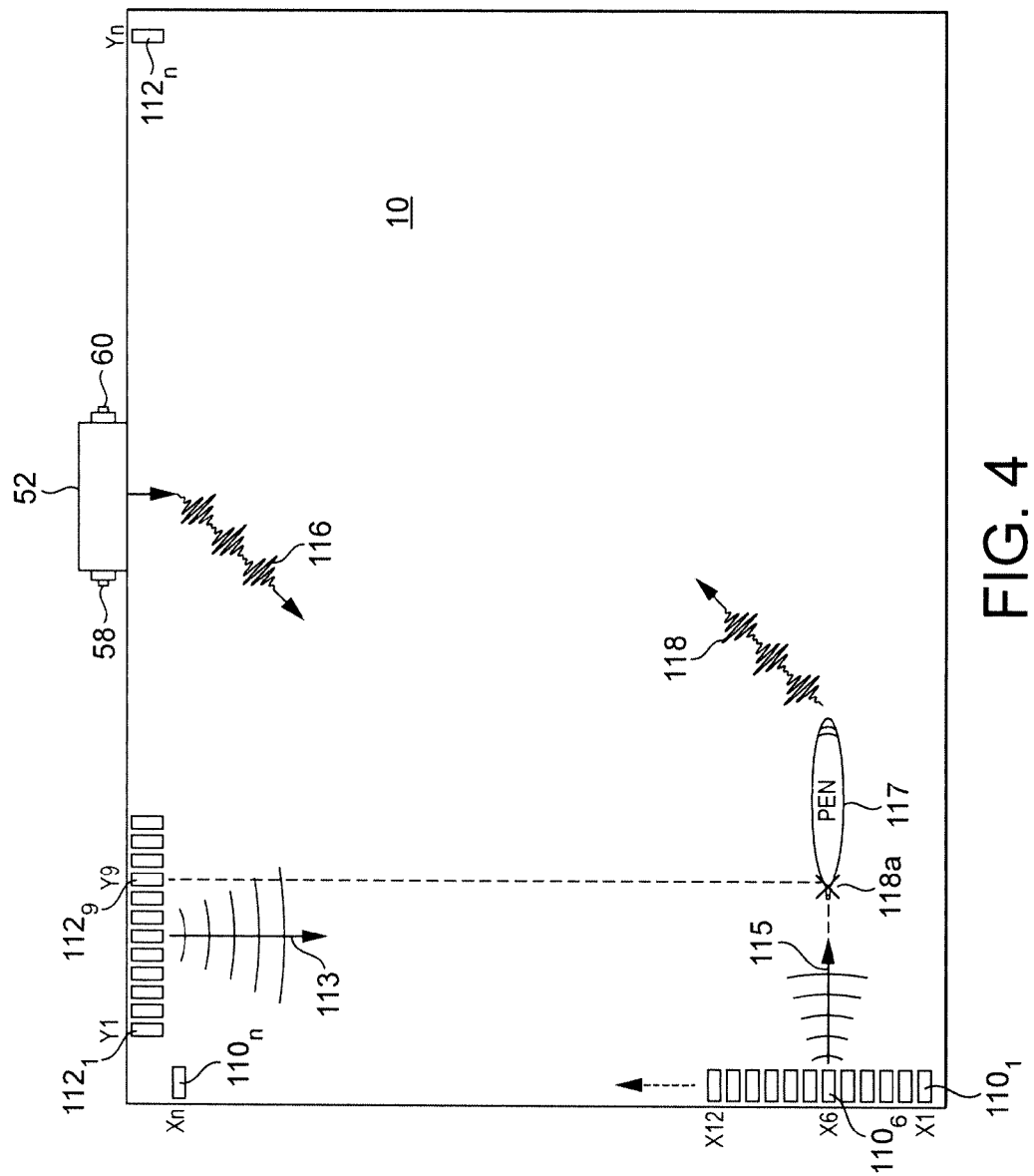
FIG. 4 illustrates an exemplary system implementation illustrating an arrangement of a touch detection apparatus incorporating bezel technology adapted to detect a contact point provided by a pen.
Figure 5:
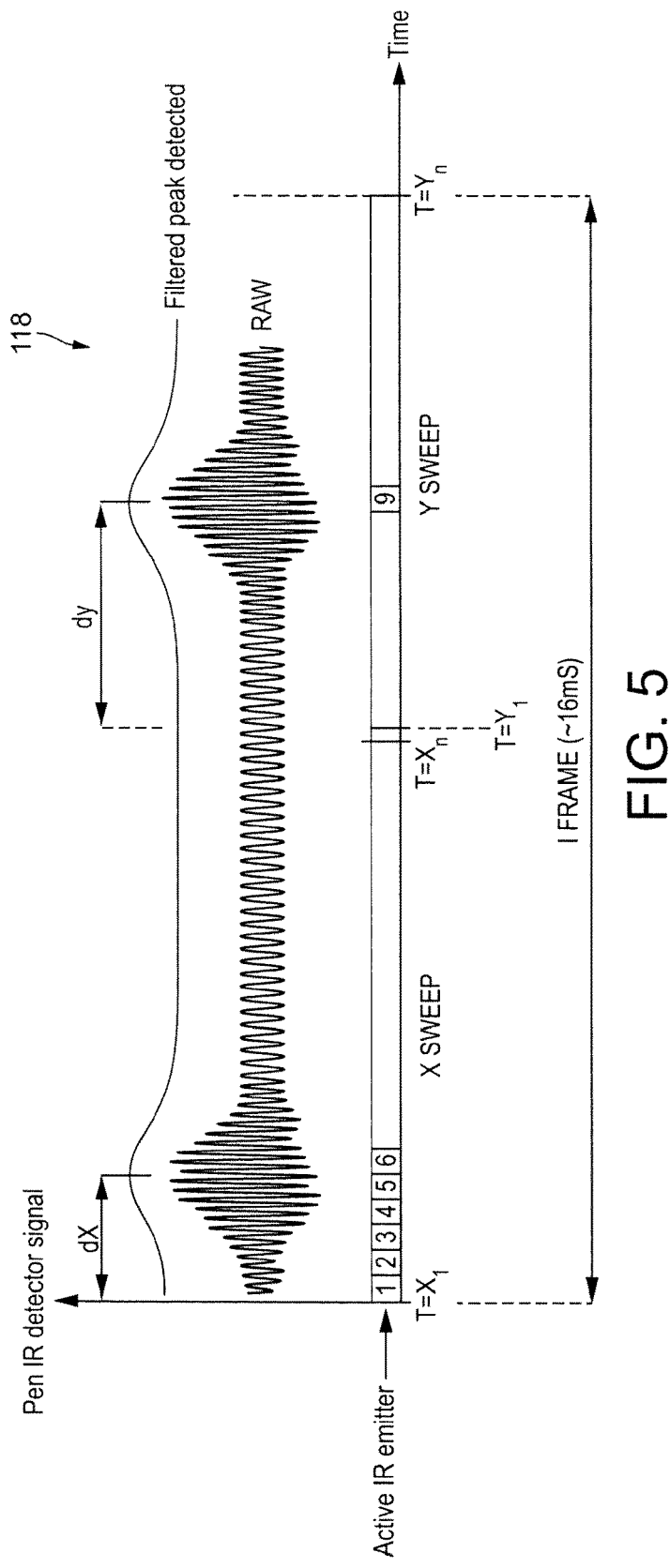
FIG. 5 illustrates the format of a signal in the arrangement of FIG. 4.

This can be further understood with reference to FIG. 4 and FIG. 5.

FIG. 4 illustrates the interactive surface 10. There is shown a plurality of bezel emitters $110_1$ to $110_n$, denoted $x_1$ to $x_n$, providing the vertical IR emissions for the bezel technology to determine an x coordinate. Also shown is a plurality of bezel emitters $112_1$ to $112_n$, providing the horizontal IR emissions for the bezel technology to determine a y coordinate.

A pen 117 which is positioned at a location denoted by cross 117a will detect an IR flux peak when the emitters $110_6$ ($x_6$) and $112_9$ ($y_9$) are excited. A timing of this peak relative to a reference mark is given by the timing of the sweep which starts when emitter $110_1$ ($x_1$) and $112_1$ ($y_1$) are excited. Based on the time elapsed since the timing mark signal, it can be determined which emitter is associated with which peak.

Thus the pen is adapted to detect an IR flux, and generate a signal which represents the amplitude of the detected flux over time.

In an illustrated example the interface 16 may be adapted to transmit an interrogation signal 116 to a pen 117 on a back-channel, and responsive thereto the pen may transmit a response signal 118. These signals are independent of the signals associated with the excitation of the bezel transmitters in order to determine a contact point.

With reference to FIG. 4, as illustrated by waveform 113 the horizontal bezel transmitters generate a wireless signal when they are excited, and as illustrated by waveform 115 the vertical bezel transmitters generate a waveform when they are excited. The generation of these wireless signals is, in accordance with known techniques, used to determine a contact point. In bezel technology, IR receivers (not shown or described) are used to determine the interruption of a transmit signal and therefore the location of a contact.

In accordance with this arrangement, the wireless signals 113 and 115 are also used by the pen 117 to generate an additional wireless signal or signals for transmission on a back-channel to the interface 16. This is the signal 118 illustrated in further detail in FIG. 5.

The signal 118 is transmitted on the back-channel to the interface in response, for example, to the receipt of an interrogation signal 116 transmitted on the back-channel by the interface 16. Such an interrogation signal may be transmitted by the interface 16, for example, when the interface 16 receives data indicating that a contact has been received. However transmission of an interrogation signal is not necessary. For example the pen may transmit the signal 118, and the timing of that signal is determined at the interface based on knowledge of the timing of the excitation of the bezel array.

As further illustrated in FIG. 5, the response signal 118 comprises a signal having a variable amplitude over time. Alternatively the pen can process the raw data and just send the data indicating the time elapsed from the START sync to PEAK signal. The response signal comprises a frame associated with a scanning period. Within a frame the bezel emitters in one axis are excited in turn, followed by the bezel emitters in the other axis being excited in turn. Thus the plot illustrated in FIG. 5 comprises a plot of amplitude against time for each emitter $110_1$ to $110_n$, followed by a plot of amplitude against time for each emitter $112_1$ to $112_n$ within a time frame. Within a time frame each emitter is excited. As each emitter is excited in sequence, the plot is a plot of amplitude against time, with each emitter excited being associated with a particular time.

As shown in FIG. 5, the plot has peak amplitudes for times associated with emitters $110_6$ and $112_9$. The peak associated with the emitter $110_6$ is determined to be a time dx from the mark or origin point, i.e. the start of the frame, and the peak associated with emitter $112_9$ is determined to be a time dy from the start of the y sweep (which commenced at the end of the x sweep and thus can be referred to as the mark or origin point).

Thus an approximate or coarse estimation of the location of a pen can be determined.

The operation of the system in accordance with this exemplary arrangement is now further described with reference to FIG. 6 and FIG. 7. Elements of those figures which correspond to earlier figures are not described in detail again, as their operation will be similar to that described above.

Figure 6:
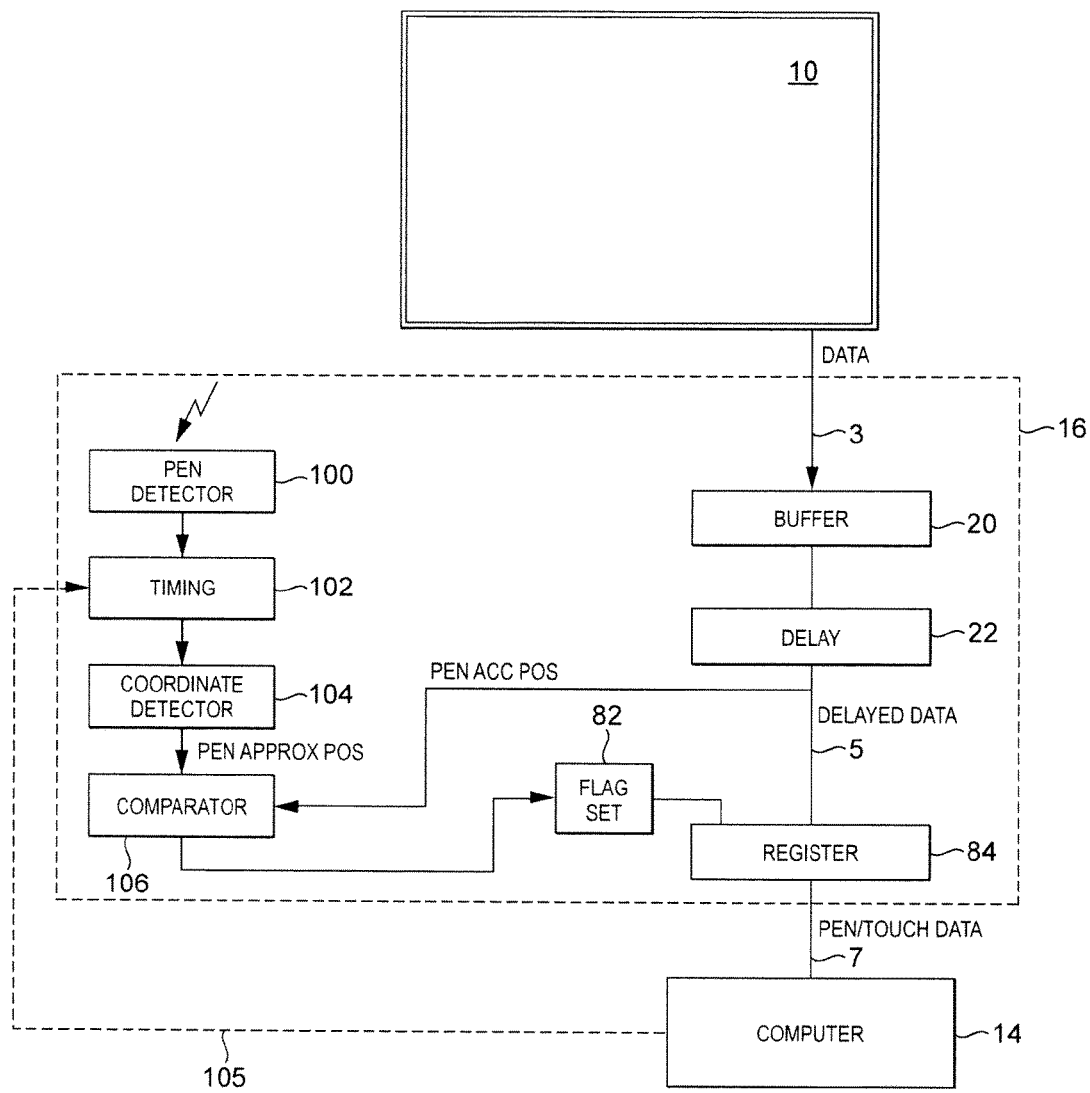
FIG. 6 illustrates a schematic of an arrangement of touch detection apparatus adapted to detect a contact point provided by a pen.

As shown in FIG. 6 the interface 16 is modified to include a pen detector 100, a timing block 102, a coordinate detector 104, and a comparator block 106. The pen detector 100 replaces the pen detector 28 of the FIG. 2 arrangement. The interface additionally includes the buffer 20 and the delay block 22. A flag set block 82 and a register 84 corresponding to the flag set block 26 and register 24 of FIG. 2 are also shown. It will be understood that the flag set block 20 and register 24 may be implemented in accordance with any foregoing arrangement, and in general implemented as necessary to enable the operation of a given arrangement.

Figure 7:
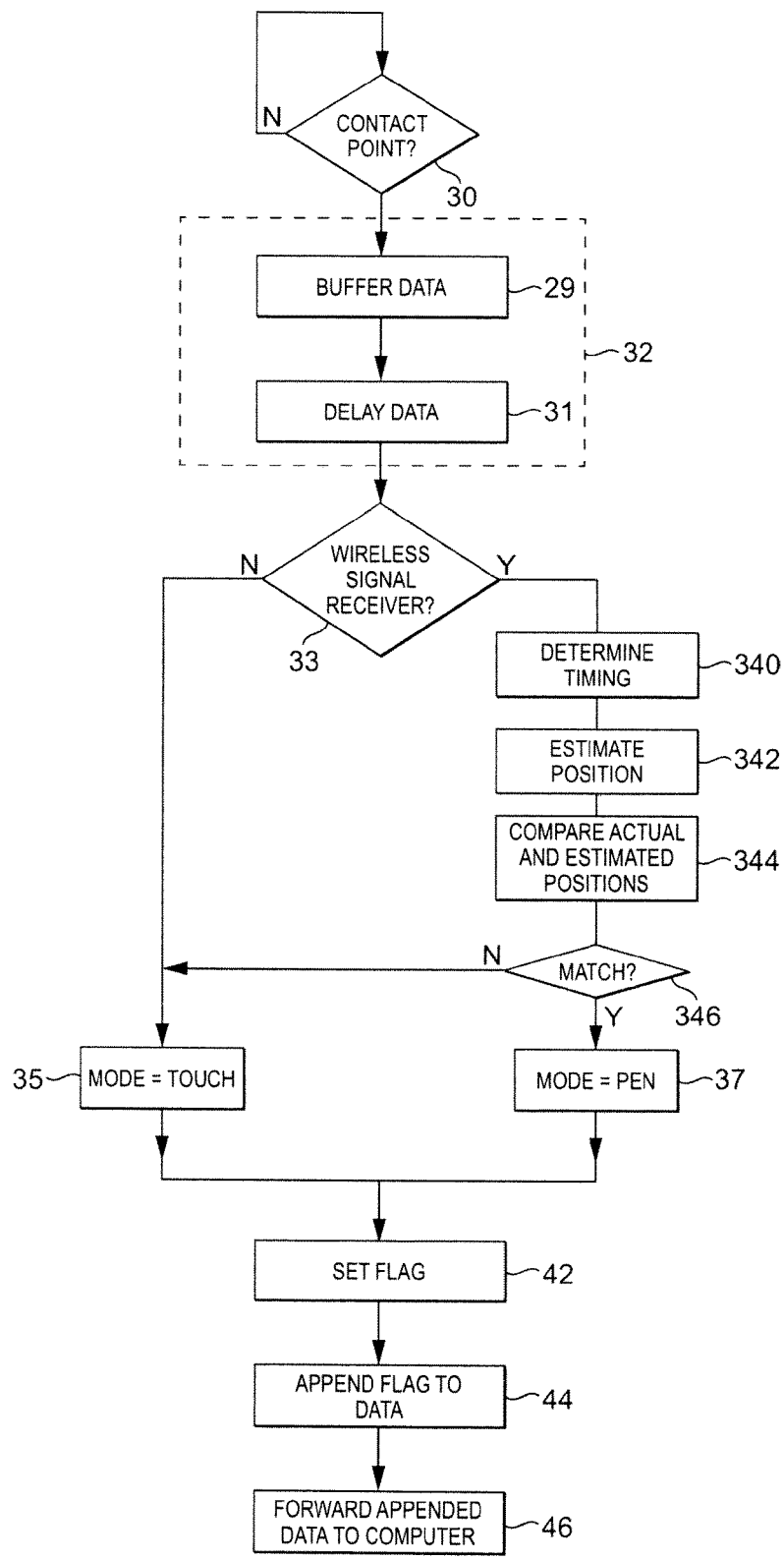
FIG. 7 illustrates a process for controlling the schematic apparatus of FIG. 6.

Referring to FIG. 7, before it is determined whether a wireless signal is received, as shown in step 33, data is buffered/delayed, as shown in step 32. The pen detector 100 is enabled to be ready to detect any wireless signal from a pen.

In the absence of any wireless signal being received by the pen detector 100 in step 33, it is determined that the contact point is a touch input, and in step 35 the mode is set as touch. As described above, method steps 42, 44 and 46 are enabled and the incoming data is then forwarded to the computer 14 as touch data. It may be determined that a contact is provided by a touch if no wireless signal is received in a certain time frame.

In the event that the pen detector 100 does receive a wireless signal, as detected in step 33, the process moves on to step 340.

If a wireless signal is detected, then the received wireless signal (which will correspond to the signal 118 of FIG. 4 and FIG. 5) is provided to timing block 102, denoted by method step 340, wherein the timing coordinates dx and dy associated with the peak amplitudes of the signal provided by the pen are determined, as discussed above, based on the signal transmitted by the pen (signal 118 in FIG. 4) on the back-channel. These timing values are determined based on the received signal and knowledge of the timing mark.

The determination associated with the timing, and synchronization between the bezel excitation and the wireless signal received on the backchannel from the pen, is outside the scope of the present invention. However in a simple case when the trigger is initiated to begin a scan of the bezel array to detect a contact point, such trigger may also be provided to the timing block 102, as denoted by dashed line connection 105 from the computer 14, the computer 14 controlling the bezel array. The timing block then knows the timing mark which may or may not also be indicated to the pen in an interrogation signal (if sent).

The timing block then provides the timing information of the received signal 118 to the coordinate detector 104, and the coordinate detector 104 estimates the position of the pen as denoted by step 342. The coordinate detector 104 is able to determine an approximate or coarse position of the pen based on the timing information, and knowledge of the emitter array positioning and the timing of the frame relative to a timing mark. This will be apparent to one skilled in the art from the foregoing.

The coordinate detector 104 generates a data signal PEN APPROX POS which represents the approximate location of a pen which is determined to be present.

At the same time the buffer 20 and/or delay 22 provides at its output an accurate determination of the position of the detected contact point, based on the processing of the data stream DATA from the interactive surface. The pen data processor outputs a data signal PEN ACC POS which represents the accurate position of the detected contact point. In examples, this coordinate information is in the data provided from the board on line 3, and no additional circuitry is required in the interface to determine this.

These two data signals are provided as inputs to the compare block 106 (or comparator), and as denoted by step 344 the compare block determines whether the two inputs match, i.e. whether the approximate pen position matches the actual or accurate pen position. In view of the approximate or coarse nature of one of these values, the match may be successful if the positions are within a certain distance of each other.

If a match is determined in step 346, then it is determined that the current contact point is provided by a pen, and as denoted by step 142 the mode of the system is set to pen mode.

If a match is not determined, then it is determined that the current contact point is provided by a touch, and as denoted by step 35 the mode of the system is set to touch mode.

If only a finger touch is present, i.e. the system is not trying to distinguish between a pen and a touch point or two pens, then there will be no comparison to make.

In accordance with this arrangement, a contact point is thus determined as being associated with a pen or a touch. Techniques may be additionally utilised to determine a pen-up or pen-down condition.

Because allocation information is utilised, this state can be determined for multiple contact points.

The adaptation of flag bits for contact point data will be apparent.

In this arrangement, there may be multiple contact points, and the ability to determine the approximate location of a pen, in addition to the presence of a pen, allows a determination to be made as to whether a current contact point is associated with a touch or a pen, and if it is associated with a pen to associate the contact point with a specific pen based on a location of the pen. This is not dependent on identifying a pen by its transmission frequency or the frequency at which it responds. When multiple pens are being detected and assigned to locations, each pen may send an identifier together with the timing information over the backchannel to allow the particular pen to be associated with a particular contact point.

It can be noted that in a multiple contact point system, the detection circuitry may be adapted to detect for all contact points, for example by being split into periods of operation for each contact point. Such techniques are known in the art.

A complexity may arise from the fact that the X-Y sweep mechanism may not be simple. Even for those systems which have a straightforward sweep arrangement before detection of a touch may have different or more complex sweep mechanisms once a touch is detected. When a contact point or multiple contact points occur, a bezel touch system knows precisely where the points occurred and consequently knows which of the X and Y bezel emitters are closest to the points of contact (perpendicular to the bezel). The sweep system described above can therefore be made more efficient by concentrating only on the areas of the surface where contact is detected. For example, to speed up response time the sweep might be confined to an area around a located object, with a whole board sweep occurring only when object tracking is lost. For a dual-touch system, two sweep zones may be activated once an object has been located. For multi-touch systems (e.g. systems for detecting 4 to 6 touches), further complexity arises.

Complexity issues can be addressed by modifying the timing block 102 associated with the detection of the IR signals from the pen, and in particular this may involve linking the timing information included in the received signal from the pen to known timing signals associated with the scanning which is provided from the circuitry controlling the scanning. This can be controlled by the computer 14, or other processing entity providing control of the scanning, by ensuring synchronisation between the first timing bock 102 and any scanning operation. Any complexities can thus be dealt with by ensuring the timing block 102 receives the necessary information associated with the current scanning.

This approach allows for detection of multiple pens, and for detection of multiple contact points. The coarse location detection provided by the arrangement allows for two or more contact points to be distinguished between, provided the contact points are not sufficiently close together to have the same coarse location coordinates.

A number of scenarios exist, and a method is now described to determine the identity of an object for all scenarios. The scenarios include a contact being provided by a touch input, a pen input, a pen and touch input or multiple contacts from several pen inputs and/or touch inputs.

In general, the IR touch board is considered to be in a 'standby' state when no contact points are currently detected by the bezel.

With the detection of a first contact point or contact points by the bezel, the IR touch board enters into what can be referred to as an 'active' state.

The IR touch board enters into what can be referred to as 'object determination' mode to determine whether the contact point is provided by a touch input or a pen input.

When additional contact points appear on the surface whilst other objects are already present and are being tracked, i.e. when the board is already in the active state, the system can be referred to as entering a 'new object detect' state.

When the IR touch board enters the active state from the standby state, it first determines which IR emitters on the X-axis and Y-axis are closest perpendicularly to the contact point location.

Figure 8:
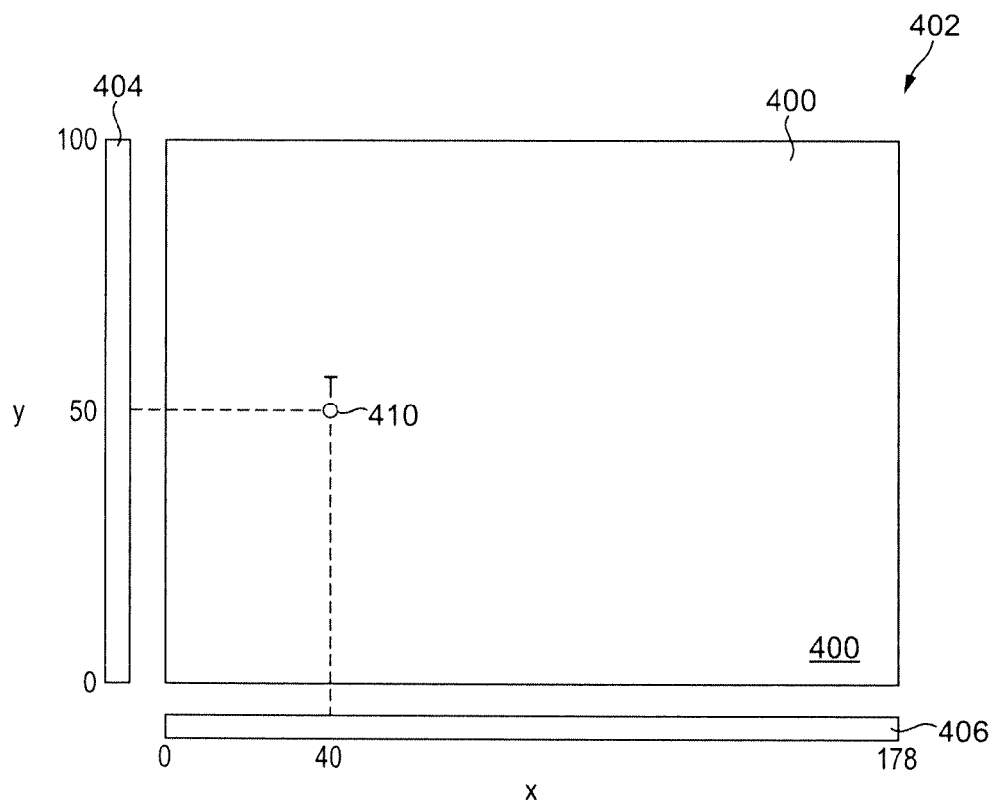
FIG. 8 illustrates an exemplary scenario of a display surface incorporating bezel technology and for determining one contact point as pen or touch.

With reference to FIG. 8 there is illustrated a system 402 comprising a contact surface 400, an array 404 of Y-axis LED transmitters, and an array 406 of X-axis LED transmitters. FIG. 8 illustrates an example of a single contact event in a bezel system, which for example is a touch contact. The exemplary bezel system has 100 emitter LED's on the Y-axis and 178 emitter LEDs on the X-axis. These numbers are arbitrary, and the actual number of emitters will depend on the resolution offered by the bezel touch system.

In the example described with reference to FIG. 8, the single contact point is assumed to be provided by a touch input at location 410 and is denoted T. As can be seen in FIG. 8, the contact point 'T' is closest to the Y50 emitter LED on the Y-axis, and the X40 emitter LED on the X-axis.

Figure 9:
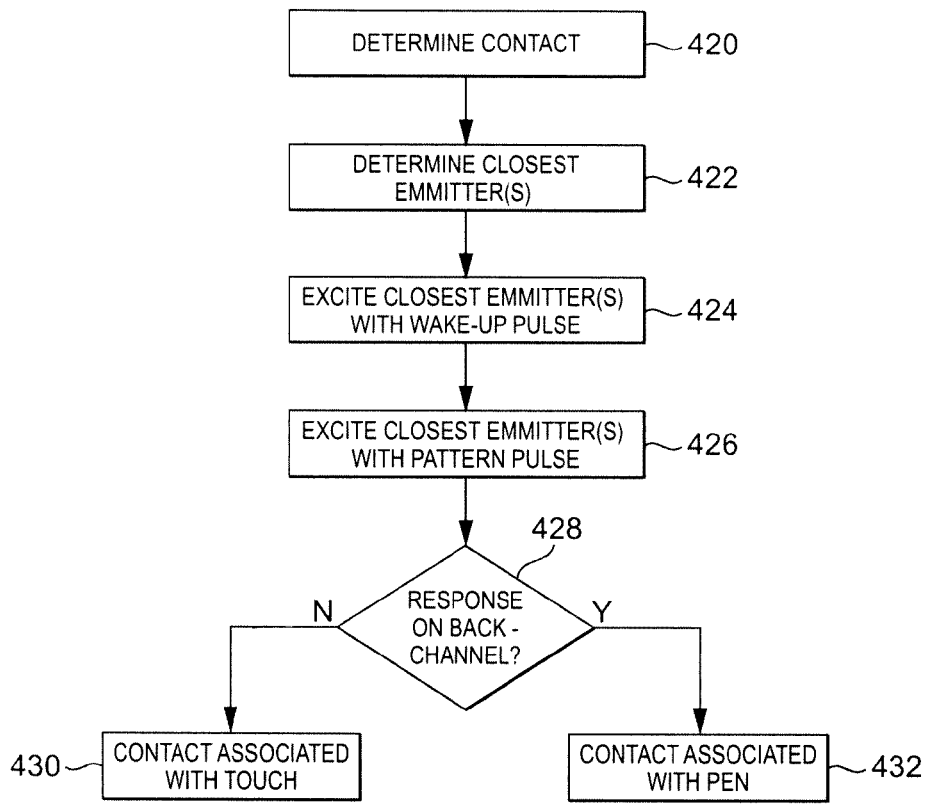
FIG. 9 illustrates a process for determining a pen or touch input for the scenario of FIG. 8.

The process is now described further with additional reference to FIG. 9.

On detection of the contact point due to the object T, the bezel momentarily ceases or suspends normal operation so that the type of input providing the contact (touch or pen) can be determined. The system thus enters an 'object determination' mode.

In accordance with known techniques, emitter Y50 is calculated by the bezel control system to be the closest LED emitter on the Y-axis and emitter X40 is determined by the bezel control system to be the closest LED emitter on the X-axis. The determination of an object or contact, and the determination of the closest LED emitters, is denoted by steps 420 and 422 in FIG. 9.

The emitter Y50, as the determined closest LED emitter on the Y-axis, is then driven to emit an excitation signal comprising a pulse train at frequency 'f'. A pen is adapted to receive the pulse train at frequency 'f'. The emitter Y50 may be chosen rather than the emitter Y40, on the basis that coordinate detection of the contact point has determined that emitter Y50 is determined to be closer to the contact point than emitter Y40.

In the described example, f=100 KHz, but it will be understood that the frequency can be chosen to suit the particular characteristics of the bezel system and may be a higher or lower frequency. Frequencies of 100 KHz or higher are preferable as they minimise the time in which the bezel system operates in 'object determination' mode.

The pulse train length is determined by the IR detector filter characteristics of the pen, and may typically be 10 cycles (100 µS at a frequency of f=100 KHz). The length of the pulse train is simply required to be of sufficient duration to guarantee that any pen detects enough incident IR energy to bring the pen out of 'sleep state'.

The transmission of this pulse train, which also may be considered as a wake-up pulse, is denoted in FIG. 9 by step 424.

In arrangements, the pulse train can also act as a pen synchronisation signal for 'object determination' events, but other methods may be used such as utilising an RF communications channel between the pen and bezel control circuits.

Once any pen has been brought out of 'sleep state' by the excitation signal, the bezel system deactivates all the IR LED emitters for a predetermined period of time before beginning the 'object determination' emission pattern.

The pen senses the end of the 'wake-up' pulse train and waits for the recommencement of IR emission.

The bezel then begins an 'object determination' pattern by transmitting or emitting a further pulse train of IR from the same emitter used for the wake-up operation. This pulse train is a coded signal, or a pattern pulse, and is denoted by step 426 in FIG. 9.

In practice, the emission might be spread across several emitters either side of the closest point. This may allow, for example, for some redundancy around the possibility that some emitters might fail during the lifetime of the system, which in normal sensing operation might not prevent the whiteboard continuing to offer satisfactory performance, albeit with slightly reduced accuracy in certain areas.

Because in this instance there is only one object detected as being on the surface, the 'object determination' mode comprises transmitting, as the coded signal, a pulse train of known length. For example this could be a 300 µs (30 cycles at 100 Khz) pulse train. If the pen is in close enough proximity to the surface to see IR from the bezel emitters, and the length of the pulse train is as expected, the pen will signal back to the bezel controller that it has successfully seen the 'object determination' pattern.

The signal back to the controller is transmitted on the 'backchannel', and could be by means of known methods of RF or IR signalling, for example a Bluetooth RF link.

The contact point is thus determined to be provided by a pen input in dependence on whether a wireless signal is received responsive to the coded signal. The pen is therefore preferably adapted to transmit on detection and determination of a coded signal.

To allow for the possibility of overcoming other sources of IR interference, the 'object determination' pattern of the coded signal may be a complex coded pattern consisting of periods of a pulse train being actively interspersed with no IR emission to create a binary pattern. For example, a logic '1' may be associated with cyclical IR emission at frequency 'f' and a logic '0' may be associated with no IR emission. The pen may then be adapted to detect a particular bit sequence, e.g. '1010', before signalling successful reception of the 'object determination' pattern on the back channel. The pen may simply wirelessly transmit to denote successful reception, or may transmit a specific wireless signal which is detected by the pen detector.

As denoted in step 428, the system determines whether a response is received on the back-channel. If a response is received the contact is determined to be provided by a pen, and the method moves on to step 432. If a response is not received, the contact is determined to be a touch and the method moves on to step 430.

The communication on the back-channel occurs in the event that the object on the surface is a pen, and therefore capable of receiving the 'object determination' pattern and signalling via the backchannel. If the detected object is a touch event, no confirmation signal will be returned via the backchannel. On this basis the bezel system determines the contact point to be provided by a touch event and not a pen.

Figure 10:
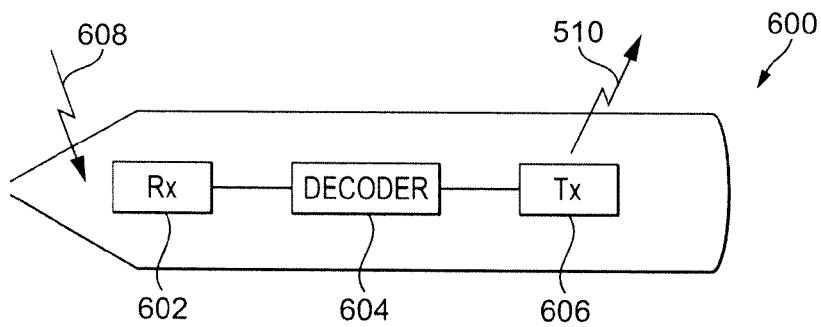
FIG. 10 illustrates a pointing device adapted for providing a pen input.

With respect to FIG. 10 there is illustrated an example implementation of an adapted device, such as a pointing device, in according with the preceding illustrated example. The device 600 includes a receiver 602, a decoder 604, and a transmitter 606.

The receiver 602 of the device is adapted to detect energy represented by wireless signal 608, for example infra-red energy from the bezel array. Such energy may be used to energise the pen, and signals in such energy transmitted through the bezel emitters are received in the receiver 602.

The decoder receives the signals received at the receiver 602, and is adapted to decode the received energy to identify a coded signal. The decoder is adapted to detect the coded signal, and activate the transmitter 606 on detection of the coded signal.

The transmitter 606 may be an IR or RF transmitter, and is adapted to transmit a wireless signal 610 on the back-channel responsive to the decoder indicating receipt of the coded signal from a bezel LED.

Figure 11:
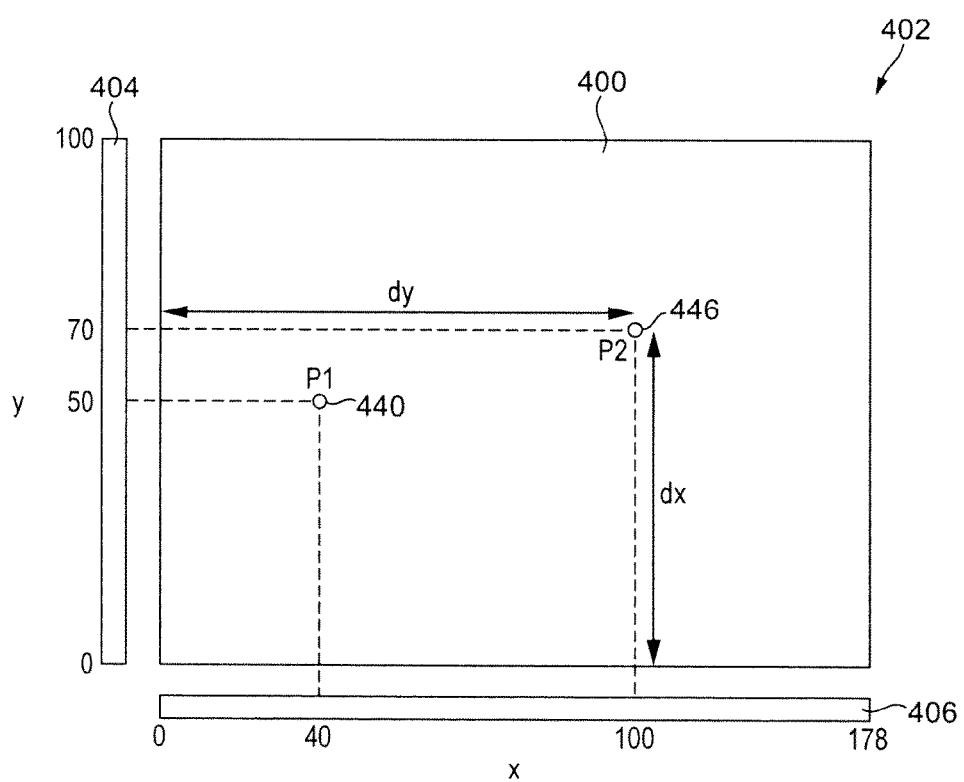
FIG. 11 illustrates an exemplary scenario of a display surface incorporating bezel technology and for determining two contact points as pen or touch.

With reference to FIG. 11, a scenario where two objects arrive on the surface simultaneously is now described.

In the example of FIG. 11 two contact points are denoted as 'P1' and 'P2' and labelled by reference numerals 440 and 446. In this example the contact points are provided by pen inputs as opposed to touch inputs. The bezel system under normal operating circumstances has no way of determining whether each contact point is provided by a pen input or a touch input.

This simultaneous arrival of more than one object is different from the case where two objects arrive on the surface at slightly different times. If objects arrive at different times, and one object is already being tracked having been identified as a pen or touch, the second object can be treated like the single object case above and its type determined in a similar fashion. However when both objects arrive simultaneously, or with not enough time to be assessed individually, ambiguity arises and the simple single 'object determination' emission pattern sequence described above may not be sufficient to remove occurring ambiguities. In this case, a modified 'object determination' sequence is necessary. This modified object determination mode may be utilised if more than one contact point is detected within a certain time window.

As for the simple single object case, the first task on detection of the two objects is to ensure that if the contacts are due to pens, the pens are brought out of sleep state.

The bezel system calculates the two bezel emitters that are closest to the two objects, and transmits an IR pulse train long enough to ensure any pen device receives the signal and enters an 'awake state'.

Figure 12:
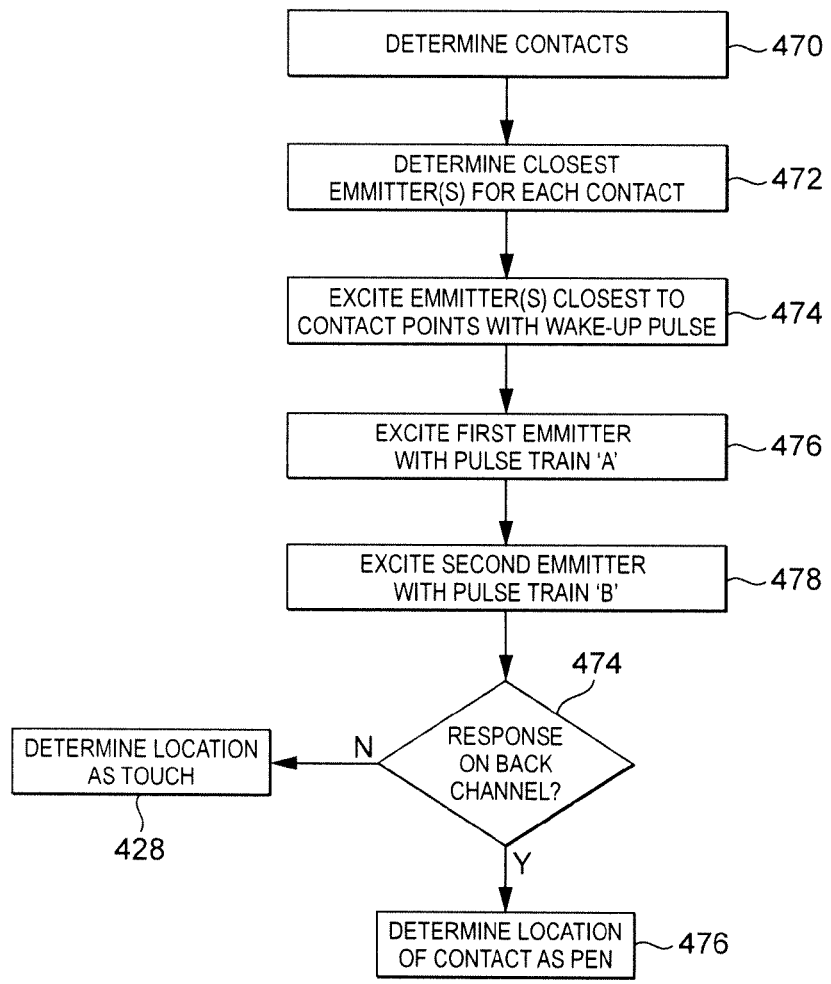
FIG. 12 illustrates a process for determining a pen or touch input for the scenario of FIG. 11.

Thus, as illustrated in FIG. 12, the contact locations are first determined in a step 470 in accordance with known bezel techniques. The closest emitter(s) for each contact point is then determined in step 472, and an excitation signal comprising a 'wake-up pulse' is then emitted through those emitters as denoted by step 474.

In the example illustrated, distance dx is shorter than distance dy, and therefore the X100 LED is chosen as the closest LED to be activated for object 'P2'. As previously mentioned, several LED's either side of this position could also be used to add some redundancy against single emitter LED failure.

For the contact point 'P1', the Y50 LED is closest and this is also controlled to transmit a pulse train of IR, in case it is a pen that needs to be awakened and synchronised in preparation for the 'object determination' sequence. At this point the system has not identified 'P1' or 'P2' as being contacts provided by a pen device. As far as the system is aware, these are simply contact points on the surface.

Once the system has completed transmitting the 'wake-up pulse' for both detected contact positions, the bezel is deactivated. If the bezel is used also to transmit a synchronisation signal to any pen, the synchronisation pulse train may be transmitted before deactivation.

After a predetermined time, any pen present on the display surface will determine that the wake-up sequence has concluded, and will prepare to receive the 'object determination' sequence.

For the scenario of multiple objects, it is possible that if the objects are either relatively close together and/or in line with each other, both objects might see emissions from both LED's selected to transmit to the two separate contact points during the 'object determination' transmissions. In this case, for example, 'P2' might receive the 'object determination' transmission from both the X100 emitter LED and the Y50 emitter LED, because the LED emission tends to diverge with increasing distance. The system could intelligently opt to select the LED emitter that gives the least chance of a pen receiving IR not intended for it. In this case, for example, X40 is the alternative LED to transmit to 'P1' with. However, some positional combinations will still mean both pens receive an 'object determination' signal from multiple sources and therefore some way of distinguishing between the two signals received is necessary.

As denoted by step 476, a first coded signal comprising pulse train denoted as 'A', of length 't', is first transmitted from position X100, and then as denoted by step 478 a second coded signal comprising pulse train denoted as 'B' of length 't/2' is transmitted from position Y50. The actual length of the transmissions is not critical so long as they are different from each other. Indeed, some other characteristic other than length of time can be used to distinguish between them.

The pen at 'P1' will see the transmission from X100 and determine its length of transmission to be 't'. As well as timing the length of transmission, the pen will also measure the intensity of incident IR energy using any number of well-known techniques beyond the scope of this invention.

Figure 13:
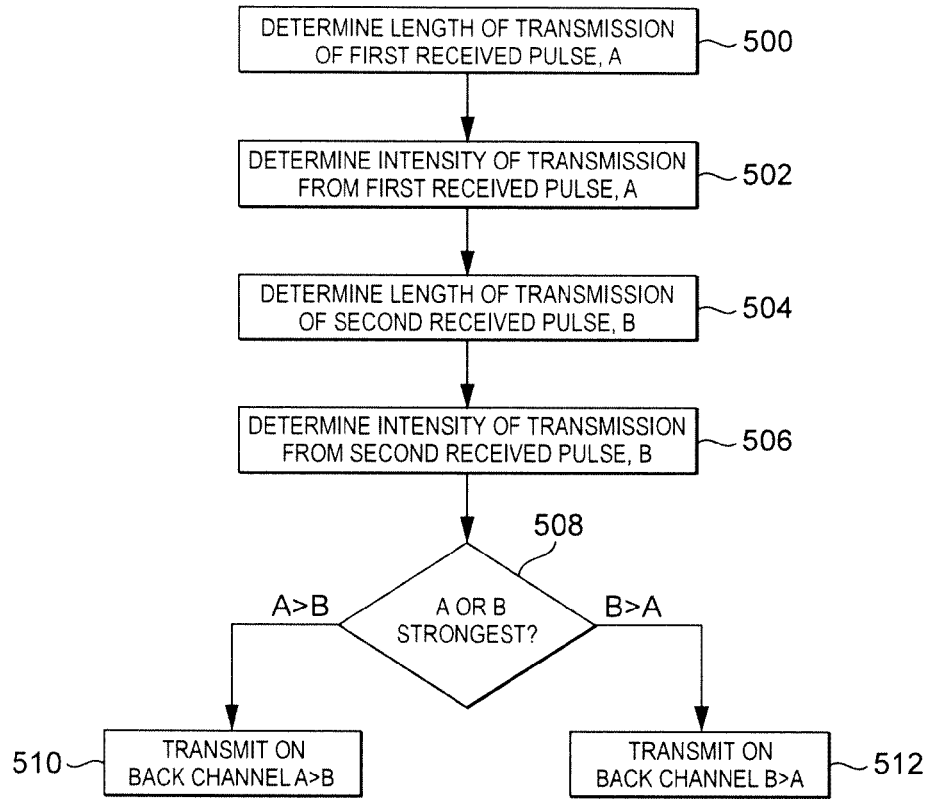
FIG. 13 illustrates a process in a pointing device for determining a pen or touch input for the scenario of FIG. 11.

Steps 500 and 502 in FIG. 13, indicate the processing steps undertaken by the pen in processing the received signal. Thus, the pen at point P2 determines the identity and strength of the received signal from emitter X100. Thus the pen at point P2 receives the first pulse train A, and identifies it based, in this example, by its length t, as denoted by step 500. The pen at point P2 then determines the intensity, for example the amplitude, of the received signal associated with pulse train A, as denoted by step 502.

The pen at 'P2' might also see the 't/2' emission from LED Y50. If it does, it will take a further measurement of the intensity of incident IR energy. The pen at 'P2' will identify the transmission as being of shorter 'B' duration (t/2). In FIG. 13, this is denoted by steps 504 and 506. Thus the pen at point P2 receives the second pulse train B, and identifies it based, in his example, on its length t/2, as denoted by step 504. The pen at point P2 then determines the intensity, for example the amplitude, of the received signal associated with the pulse train B, as denoted by step 506. Thus, the pen at point P2 determines the identity and strength of the received signal from emitter Y50.

The pen at contact point P2 can now determine which of the 'A' or 'B' duration transmissions was the strongest in terms of having the largest intensity. This determination is denoted by step 508.

In this case it will be from the source originating from LED X100. This information will be relayed back to the bezel controller via the backchannel communications system in the form of A>B, as denoted by step 510. Thus the pen communicates on the backchannel that the signal from one source was higher than the other, the pen being able to uniquely identify the signal from the two sources. If the other condition was true, the backchannel transmission would indicate B>A in step 512.

The pen located at P1 will see the transmission from LED Y50, but may be too far removed in the X-axis to see the transmission from LED X60. In this case, the pen will measure the intensity (such as the amplitude) of the received transmission, and because it fails to measure a second transmission, it will substitute a 'zero' for the measured amplitude of the second signal. It will then signal back to the bezel controller a signal in the form B>A, as denoted by step 512, where A will have a zero value.

Thus, in the case of determination of two contact points, the pen may be adapted such that it knows the identity of the two coded signals that are transmitted. Thus if the pen does not receive one of the coded signals, it is able to identify the received intensity of that code as zero. The pen is therefore able to transmit that the received intensity of one code is greater than the received intensity of the other, even when the other is in fact not received. The pen may then still perform both of the steps 500/502 and 504/506, but return an intensity value of zero for the pulse that is not received.

The bezel controller knows which LED transmitted each sequence, and therefore can determine through logic that P1 is closest to Y50 and P2 is closest to X60.

The system does not need to make absolute measurements of the IR signal strength: it simply has to determine which received signal is the largest. This is beneficial, because the radiant intensity of the bezel LED's can vary from device to device quite significantly, favouring a ratio-metric measurement technique rather than an absolute measurement.

As further denoted in FIG. 12, if in step 474 a response is received on the back-channel, then in step 476 the contact point from which the response is derived can be determined, and that contact point is denoted as being provided by a pen input. Otherwise as denoted by step 478, the contact point is denoted as touch. Thus it can be determined whether two contact points are provided by pen or touch inputs.

Figure 14:
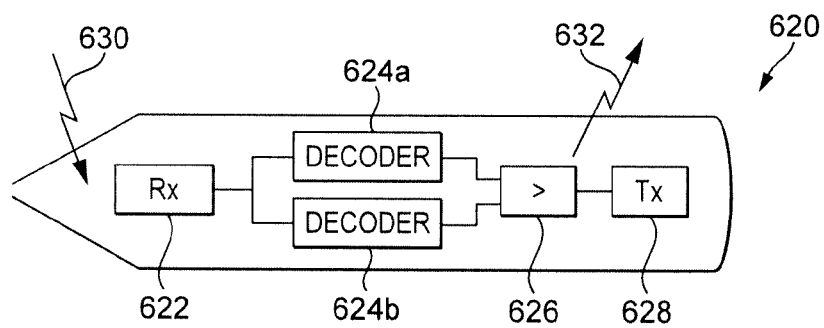
FIG. 14 illustrates a pointing device adapted for providing a pen input.

With respect to FIG. 14 there is illustrated an example implementation of an adapted device, such as a pointing device, in according with the preceding illustrated example. The device 620 includes a receiver 622, decoders 624a and 624b, a comparator 626, and a transmitter 606.

The receiver 622 of the device is adapted to detect energy represented by a wireless signal 630, for example infra-red energy from the bezel array. Such energy may be used to energise the pen, and such energy transmitted through the bezel emitters is received in the receiver 622.

The decoders 624a and 624b are adapted to decode the received energy to identify a coded signal. The decoders are adapted to detect the coded signals. For example, the decoder 624a may be adapted to identify the first coded signal, and the decoder 24b may be adapted to identify the second decoded signal.

The outputs of the decoders 624a and 624b are provided to the comparator 626, which compares the intensity of the received signals, and provides the results of the comparison to the transmitter 628 which transmits the appropriate signal on the backchannel as wireless signal 632.

The transmitter 606 may be an IR of RF transmitter, and is adapted to transmit a wireless signal on the backchannel responsive to the decoder indicating receipt of the coded signal from a bezel LED.

It will be understood that this technique can be extended to more than two contact points.

Figure 15:
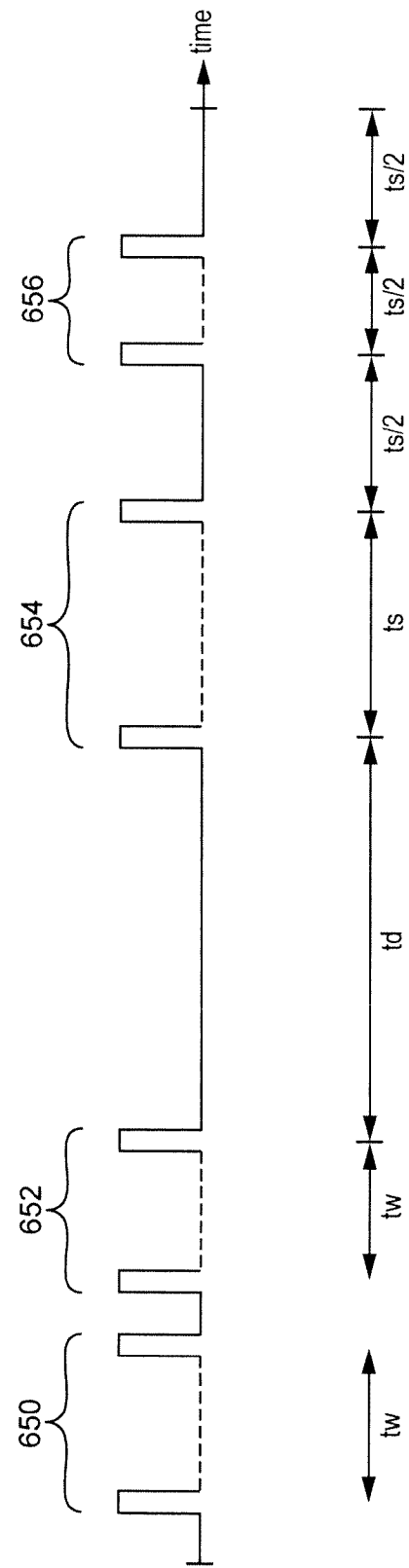
FIG. 15 illustrates signals and signal timings in the scenario of FIG. 11.

FIG. 15 shows, for completeness, an example timing diagram for the sequence described above for the FIG. 11 scenario. Timings, frequencies, and numbers of cycles indicated are an example of a practical implementation but may vary significantly depending on the bezel system characteristics and pen receiver characteristics etc.

As denoted by reference numeral 650, the LED emitter associated with pixel position 100 in the X array transmits a signal of 10 cycles in a time period $t_w$. Following this, as denoted by reference numeral 652, the LED emitter associated with pixel position 50 in the Y array transmits a pulse signal of 10 cycles in time period $t_w$. The time period $t_w$ may be 100 μs. The pulse signals of length $t_w$ from the X100 and Y50 LED emitters comprise the wake-up pulses.

A time period $t_d$ then elapses. $t_d$ may be greater than twice $t_w$, and may be 250 μs. On termination of the time period $t_d$, the 'object determination' sequence begins.

In the object determination sequence, a first pulse train 654 of 10 cycles is transmitted from the LED emitter at X100, in a time duration $t_s$, wherein $t_s$ may be 100 μs. After a time period of $t_s/2$, a second pulse train 656 of 5 cycles (half the first pulse train) is transmitted from the LED emitter Y50. After a time period of $t_s/2$ the object determination sequence ends.

It will be understood that the timings and frequencies mentioned and illustrated are for example only, and can be determined to best suit the bezel LED characteristics. The number of cycles may be adjusted to suit the emissions characteristics of the bezel emitters and pen receiver characteristics.

FIG. 15 is illustrative only, and not drawn to scale.

As can be understood by someone skilled in the art, the mechanism outlined above can be adapted and extended to detect any combination and/or number of pen and touch events.

Additionally, this method is not limited to using the duration of the pulse train sequence used for uniquely identifying different sources ('A' or 'B' in the example given). Alternative methods might vary the frequency of the pulse train, for example.

Similarly, simple continuous pulse trains could be replaced with coded sequences to add robustness to the sequences when considering system noise and external interference. The important factor is that the characteristics of the incident received signals in the pen can be uniquely identified to have originated from a different source.

Once an object has been identified as being a pen and being tracked, the pen can communicate over a backchannel system, preferably RF, with the touch control system to report the status of pen buttons and to identify itself with a unique code when several different pens are being used simultaneously.

The present invention has been described by way of reference to particular examples and preferable aspects of those examples. One skilled in the art will appreciate that the invention and those examples are not limited to any details given, unless as defined by the appended claims. Various details may be optionally applied in different examples, and various details may be applied alone or in combination to different examples.

The invention claimed is:

1. A method for detecting the presence of a pointing device at an interactive surface, which interactive surface is provided with an illumination field for detecting a contact point, the method comprising: identifying a contact point using the illumination field; energizing any pen device proximate the surface utilizing energy provided by the illumination field; transmitting a wireless signal from any pen device energized by the illumination field; determining if a wireless signal is received from a device excited by the illumination field; and in dependence on receipt of the wireless signal: (i) identifying data associated with the contact point as touch data if no wireless signal is received; and (ii) identifying data associated with the contact point as pen data if the wireless signal is received.

2. The method of claim 1, further comprising determining an approximate location of the pointing device, and comparing the approximate location to a location of the contact point, wherein the data associated with the contact point is identified as pen data if the locations match.

3. The method of claim 1, wherein on identifying a contact point, an emitter of the illumination field closest to the contact point is determined, wherein an excitation signal is then emitted from that emitter.

4. The method of claim 3, wherein following transmission of the excitation signal, a coded signal is emitted from the emitter.

5. The method of claim 4, wherein the determination of receipt of the wireless signal is responsive to emission of the coded signal.

6. The method of claim 4 further comprising providing a pen adapted to be enabled to transmit a wireless signal on detection of the coded signal.

7. The method of claim 1 wherein on determination of a plurality of contact points, an emitter of the illumination field closest to each contact point is determined, and an excitation signal is transmitted from each emitter.

8. The method of claim 7, further comprising determining the closest emitter to each contact point of the plurality of contact points, and transmitting a plurality of coded signals corresponding to the plurality of contact points.

9. The method of claim 8, further comprising a device adapted to receive a coded signal, and to identify a received signal as being one of the plurality of coded signals and to determine the intensity of the one of the plurality of coded signals.

10. The method of claim 9, wherein the device receives at least two coded signals of the plurality of coded signals and identifies each one of the at least two coded signals, and further determines the intensity associated with each one of the two coded signals.

11. The method of claim 10, wherein the coded signal with the highest intensity represents the emitter that is closest to the contact point and further wherein the device transmits in the wireless signal an identification of the at least two coded signals, and an indication of which of the at least two coded signals has the greater intensity.

12. The method of claim 9 wherein the device receives one coded signal, wherein the device transmits in the wireless signal an indication of the received one coded signal.

13. The method of claim 12 wherein the device transmits in the wireless signal an indication of the coded signal which was not received.

14. A contact detection system comprising: a bezel array apparatus for providing an illumination field to identify a contact point on a surface and for energizing any pen device proximate the surface utilizing the energy provided by the illumination field a wireless detection circuitry for detecting a wireless signal; and identification circuitry for identifying data associated with a detected contact point as being pen data on detection of a wireless signal by the wireless detection circuitry and as being touch data on detection of no wireless signal by the wireless detection circuitry.

15. The contact detection system of claim 14, wherein there is further provided circuitry for determining an approximate location of a pointing device, and circuitry for comparing the approximate location to the location of the contact point, wherein the data associated with the contact point is identified as being provided by a pointing device if the locations match.

16. The contact detection system of claim 14 wherein on determination of a contact point, an emitter of the bezel array apparatus closest to the contact point is determined, wherein the bezel array apparatus is adapted to excite the emitter closest to the contact point and further wherein the bezel array apparatus is adapted to emit a coded signal from the emitter and wherein the wireless detection circuitry is responsive to transmission of the coded signal.

17. The contact detection system of claim 16, wherein the system further comprises a device for transmitting a wireless signal on detection of the coded signal.

18. The contact detection system of claim 14 wherein on determination of a plurality of contact points, an emitter of the bezel array apparatus closest to each one of the plurality of contact points is determined, wherein the bezel array apparatus is adapted to excite the emitter of the bezel array apparatus closest to each one of the plurality of contact points and wherein the emitter of the bezel array apparatus closest to each contact point is excited with a respective coded signal and further comprises a device adapted to detect each respective coded signal, and to identify an intensity associated with each respective coded signal.

19. The contact detection system of claim 18 wherein the device is adapted to receive at least two coded signals and identify each one of the at least two coded signals, and further determine the intensity of each one of the at least two coded signals and wherein one of the at least two coded signals with the highest intensity represents the emitter which is closest to the contact point and wherein the device is further adapted to transmit in the wireless signal an identification of the at least two coded signals and an indication of the one of the at least two coded signals with the highest intensity.

20. The contact detection system of claim 19 wherein if the device receives only one coded signal, the device transmits in the wireless signal an indication of the received coded signal and wherein the device is further adapted to transmit in the wireless signal an indication of the coded signal which was not received.

* * * * *